United States Patent Office.

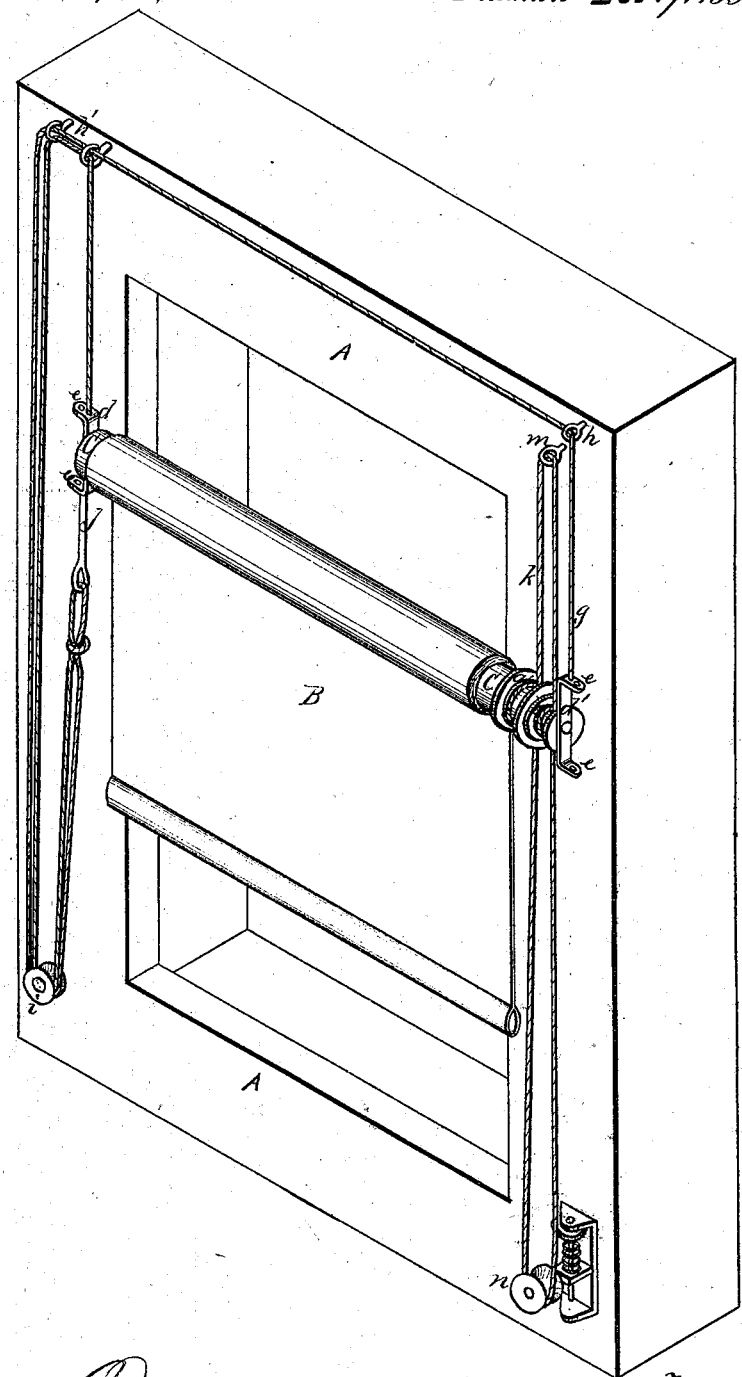

JOHN I. TAY AND LODOWICK L. SAWYER, OF OAKLAND, CALIFORNIA.

IMPROVED MEANS FOR HANGING WINDOW-SHADES.

Specification forming part of Letters Patent No. 97,727, dated December 7, 1869.

*To all whom it may concern:*

Be it known that we, JOHN I. TAY and LODOWICK L. SAWYER, both of Oakland, county of Alameda, State of California, have invented Improvements in Hanging Window-Shades; and we do hereby declare the following description and accompanying drawing are sufficient to enable any person skilled in the art or science to which it most nearly appertains to make and use our said invention or improvements without further invention or experiment.

Our invention relates to improvements in hanging window-shades in front of windows; and it consists in an arrangement whereby the shade can be lowered from the top and elevated from the bottom, so as to stand at any desired position, the whole being accomplished with but few cords and fixtures, and presenting a neat and tasteful device for the purpose.

In order to explain our invention so that others can make and use our said invention, reference is had to the accompanying drawing and letters marked thereon, forming a part of this specification, in which—

A represents the inside of a window-frame upon which it is desired to hang the shade so as to cover the window, which is placed in the frame.

The shade B is secured at its upper end to a roller, C, in the usual manner of the ordinary curtain. The roller C is provided at one end with two pulleys, the one, *a*, which is next to the end of the roller being fixed, while the one, *b*, which is placed outside of the pulleys *a* is loose and revolves upon a journal on the end of the roller.

At each end of the roller C metal plates *d d'* are loosely attached by screws or other equivalent device, which secure them to the end of the rollers through their middles. Both ends of these plates are bent outward so as to form ears *e e*, or they may be bent inward and serve a similar purpose.

Guide-rods *f*, or equivalent device, are arranged upon each side of the frame, which pass through holes in the ears *e e* of the plates *d d'*, so that the roller will move up and down between them and be guided in its movement by them. A cord, *g*, has one of its ends secured to the upper ear of the plates *d'*, from which it is carried upward and over a pulley or hook, *h*, directly over the end of the roller; thence it is carried across the top of the window to the opposite corner, where it meets the opposite end of the same cord, which has been secured to the upper ear, *e*, of the plate *d*. The cord thus doubled is carried over a second pulley, *h'*; thence extending downward, it passes around a loose pulley, *i*, and passing upward again, it is attached to the lower ear of the plate *d*, a piece of elastic, *j*, or other device for giving a tension, being inserted at some point in its length, in order to keep the entire cord taut. Two cords might be used instead of one.

By drawing downward upon the side of the cord which pulls upon the upper ears the roller will be raised to the top of the window, and by drawing downward upon the opposite side it will be lowered to any position desired.

An endless cord, *k*, is arranged upon one side of the frame, so that it shall pass around a hook or pulley, *m*, at the top of the window, one of the two parallel cords passing around the fixed and the other around the loose pulley, the lower end being passed over the pulley *n*, which is so arranged as to be always kept taut by a spiral or other spring. After the roller has been adjusted to the desired position by the cord *g* the shade can be rolled or unrolled without disturbing the position of the roller by drawing upon the endless cord *k*, in the same manner as in the ordinary window-shade, the effect of pulling upon either side of the cord being to cause the pulley of the cord drawn upon—either the fixed or movable one—to revolve in the direction in which the pull is given, while the other one revolves in the opposite direction, thus turning the roller in either direction.

By this arrangement of cords and pulleys we produce a method of hanging window-shades which is at once cheap and free from complications, and which has the advantage of being adjusted in front of the window, as desired.

What we claim, and desire to secure by Letters Patent, is—

The combination, with an adjustable shade-roller, C, of a fixed pulley, *a*, loose pulley *b*, and endless cord *k*, arranged to operate as herein set forth.

In witness whereof we have hereunto set our hands and seals.

JOHN I. TAY. [L. S.]
          LODOWICK L. SAWYER. [L. S.]

Witnesses:
  JOHN L. BOONE,
  GEO. H. STRONG.